Figure 1:
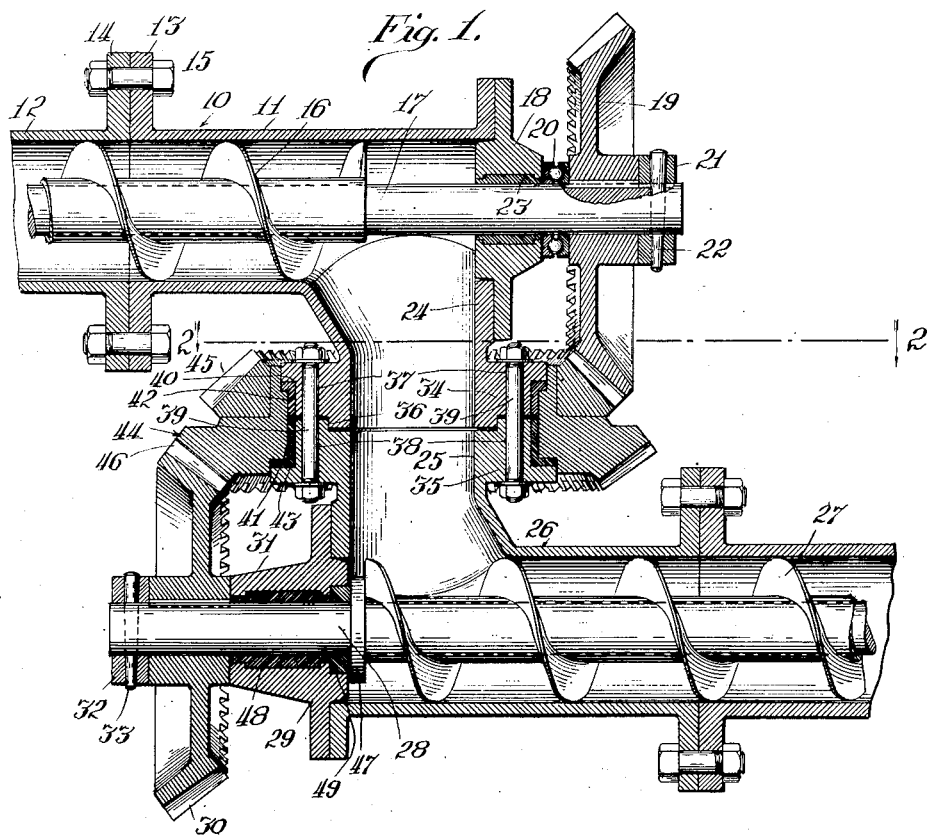

Dec. 9, 1924.

A. H. BRUNNER 1,518,898

CONVEYING APPARATUS

Filed June 1, 1923

Inventor.
Albert H. Brunner
By Barnett Brunner
Attorneys.

Patented Dec. 9, 1924.

1,518,898

UNITED STATES PATENT OFFICE.

ALBERT H. BRUNNER, OF OAK PARK, ILLINOIS, ASSIGNOR TO RAYMOND BROS. ENGINEERING CO., OF CHICAGO, ILLINOIS, A CORPORATION OF ILLINOIS.

CONVEYING APPARATUS.

Application filed June 1, 1923. Serial No. 642,786.

*To all whom it may concern:*

Be it known that I, ALBERT H. BRUNNER, a citizen of the United States, residing at Oak Park, in the county of Cook and State of Illinois, have invented certain new and useful Improvements in Conveying Apparatus, of which the following is a specification.

My invention relates to conveying apparatus of the screw conveyor type which is composed of a plurality of sections, the material conveyed being delivered by one section to the next; and the primary object of the invention is to provide an arrangement whereby the screw in one section is driven from the screw of an adjacent section, and whereby one of said sections, as a whole, may be adjusted angularly with respect to the other section without disturbance of or change in the interposed transmitting mechanism.

The invention consists of the new and improved constructions, arrangements and devices to be hereinafter described and claimed for carrying out the above stated objects and such other incidental objects as will be referred to in the following description of the invention.

The accompanying drawing shows the invention in a preferred embodiment.

In the drawing—

Figure 2:
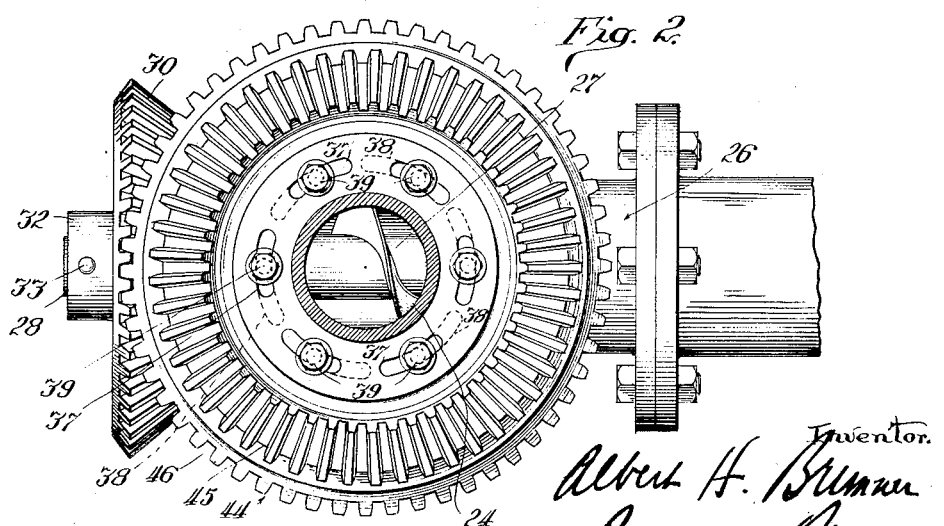

Fig. 1 is a fragmentary vertical sectional view through adjoining conveyor sections, and Fig. 2 is a sectional plan view on line 2—2 of Fig. 1.

Referring to the drawing, 10 designates a conveyor casing composed preferably of any number of flanged castings suitably connected together. In the drawing I have shown two such castings 11 and 12, which are provided with flanges 13 and 14 secured together by bolts 15. Within the casing 10 is arranged a screw conveyor 16 on a shaft 17 which extends through the end closure plate 18 at the right hand end of the casing and is provided with a bevel gear 19 keyed to the shaft and held between a thrust bearing 20 and a collar 21 secured to shaft 17 by pin 22. A bushing 23 is arranged in the end closure 18 to provide a bearing for the conveyor shaft 17. The end casting 11 of the conveyor casing 10 is formed at its outer end with a depending neck portion 24 which forms in effect a discharge chute for the material brought to this end of the casing by the conveyor screw 16. The neck portion 24 of conveyor casing 10 aligns with the upstanding neck portion 25 of a conveyor casing 26 arranged at a lower level than conveyor casing 10. Within the lower casing 26 is a screw conveyor 27, the shaft 28 of which extends through the closure plate 29 at the left hand end of the casing and is provided with a bevel gear 30 keyed to said shaft and held between a boss 31 on the closure plate and a collar 32 secured to the end of the shaft by pin 33. The material discharged from the upper casing 10 enters the lower casing, passing through the neck portions 24, 25 of said casing and is picked up by conveyor 27 and moved through the lower casing to the right. The neck portions 24, 25 are formed with flanges 34, 35 preferably shouldered at 36 in order to center them one with respect to the other and one, or preferably both, of these flanges are formed with arcuate slots 37, 38 to receive bolts 39 whereby the conveyor casings may be secured together with capacity for angular adjustment. The flanges 34, 35 are recessed at 40, 41 to receive a two-part recessed bushing 42, 43 on which turns a gear element 44 having two sets of beveled gear teeth 45, 46 meshed with the gear wheels 19 and 30, respectively, on the shafts of the upper and lower conveyor screws.

The gear ratio is preferably such that the lower conveyor 27 is driven at a somewhat higher speed than the upper conveyor to compensate for slippage of the material handled. This material may be of any sort commonly moved by screw conveyor, the apparatus being designed particularly for the transportation of pulverized coal.

The screw conveyors may be of any suitable construction. The shaft 28 of the conveyor is preferably formed with a circular shoulder 47. The shaft has a bearing in a bushing 48 within the boss 31 of the closure plate 29 and a dust ring 49 is arranged in a recess in the inner side of the closure plate. The shoulder 47 bears against the dust ring the thrust of the conveyor being in this direction.

Operation: By loosening the bolts 39 the lower conveyor may be turned to any angular position with respect to the upper conveyor within the limits permitted by the length of the arcuate slots 37, 38 in the flanges 34, 35; and this adjustment involves no disturbance of or change in the mechanism for transmitting motion from the upper conveyor to the lower conveyor, or vice versa, as the case may be. The transmitting gears are self adjusting to any change in angular relationship between the sections of the conveyor. The material conveyed from left to right through the upper casing 10 falls down through the passageway provided by the neck portions 24, 25 of the upper and lower casing into the lower casing where it is picked up by conveyor 27 and carried forwardly through the lower casing, preferably as stated, at a trifle higher rate of speed. It will be understood that the conveying apparatus of my invention may consist of more than two conveyor sections if circumstances require it.

I claim:

1. In conveying apparatus, the combination of communicating conveying casings, means for holding said casings in cooperative relationship with capacity for angular adjustment of one casing with respect to the other, conveyor screws in said casings, and a power transmitting mechanism interposed between said screws comprising gear wheels on the shafts of said conveyor screws, and a gear wheel arranged to turn on an axis at right angles to the axes of the aforesaid gears and meshed therewith.

2. In conveying apparatus, the combination of tubular, elbow shaped conveying casings, which communicate with each other through their elbow portions means for pivotally connecting said casings with capacity for angular adjustment of one casing with respect to the other, conveyor screws in said casings, and intermeshing gears interposed between said conveyor screws for imparting motion from one screw to the other which are arranged to rotate about the axis of said pivotal connection so as to be self adjusting for different angular positions of the casings.

3. In conveying apparatus, the combination of communicating conveying casings, means for holding said casings in cooperative relationship with capacity for angular adjustment of one casing with respect to the other, conveyor screws in said casings, gear wheels on the shafts of said conveyor screws, and a transmitting gear element meshed with the aforesaid gear wheels which turns on an axis coincident with the axis of angular adjustment as between said casings.

4. In conveying apparatus, the combination of communicating conveying casings, means for holding said casings in cooperative relationship with capacity for angular adjustment of one casing with respect to the other, conveyor screws in said casings, beveled gears on the shafts of said conveyor screws, and a transmitting gear element having two sets of beveled gear teeth meshed with the aforesaid beveled gears, respectively, which transmitting gear element turns upon an axis coincident with the axis of angular adjustment as between said casings.

5. In conveying apparatus, the combination of communicating conveying casings, means for holding said casings in cooperative relationship with capacity for angular adjustment of one casing with respect to the other, conveyor screws in said casings, gear wheels on the conveyor screws, and a gear meshed with the aforesaid gears and formed to impart motion from one screw to the other at a different speed and arranged to permit self adjustment for different angular positions of the casings.

6. In conveying apparatus, the combination of conveyor casings having aligned neck portions, means for fastening said neck portions together, conveying screws in said casings, respectively, provided with gear wheels, and a gear element surrounding the neck portions of said casing and meshed with said gear wheels.

7. In conveying apparatus, the combination of conveyor casings having aligned neck portions, means for fastening said neck portions together, conveying screws in said casings respectively provided with beveled gears, and a gear element surrounding the neck portion of said casings and provided with two sets of beveled gear teeth to mesh with the beveled gears on said conveying screws, respectively.

8. In conveying apparatus, the combination of conveyor casings having aligned neck portions, means for fastening said neck portions together adjustably to permit change in angular position of one casing with respect to the other, conveying screws in said casings, respectively, provided with gear wheels, and a gear element surrounding the neck portions of said casings and meshed with said gear wheels.

9. In conveying apparatus, the combination of conveyor casings having aligned flanged neck portions, bolts for fastening said flanges together, one of said flanges being slotted for said bolts to permit change in angular position as between said casings, conveying screws in said casings, respectively, provided with gear wheels, and a gear element surrounding the neck portions of said casings and meshing with said gear wheels.

10. In conveying apparatus, the combination of conveyor casings having aligned flanged neck portions, bolts for fastening said flanges together, both of said flanges being slotted for said bolts to permit change in angular position as between said casings, conveying screws in said casings, respectively, provided with gear wheels, and a gear element surrounding the neck portions of said casings and meshing with said gear wheels.

11. In conveying apparatus, the combination of conveyor casings having aligned neck portions, means for fastening said neck portions together adjustably to permit change in angular position of one casing with respect to the other, conveying screws in said casings, respectively, provided with gear wheels, a gear element surrounding the neck portions of said casings and meshed with said gear wheels, and a bushing surrounding the neck portions of said casings to provide a bearing for said gear element.

12. In conveying apparatus, the combination of conveyor casings having aligned neck portions, means for fastening said neck portions together adjustably to permit change in angular position of one casing with respect to the other, conveying screws in said casings, respectively, provided with gear wheels, a gear element surrounding the neck portions of said casings and meshed with said gear wheels, and a two-part bushing surrounding the neck portions of said casings and formed with flanges to provide a recessed bearing for said gear element.

13. In conveying apparatus, the combination of a casing one end of which is formed in the bottom with a discharge opening, a casing below the first named casing, one end of which is formed in the top with a receiving opening arranged in alignment with the discharge opening of the upper casing, conveying screws in said casing, gear wheels on the shafts of said conveying screws, respectively, and an annular gear element meshed with said gear wheels and turning on an axis coincident with the centers of the discharge and receiving openings in said casings.

14. In conveying apparatus, the combination of a casing, one end of which is formed with a depending neck portion for discharge of the material, a casing below said first named casing one end of which is formed with an upstanding neck portion, means for connecting said neck portions with capacity for angular adjustment between said casings, conveying screws in said casings, respectively, gear wheels on said screws, and an annular gear element surrounding said neck portions of the casings and meshed with the gear wheels on the conveyor screws.

15. In conveying apparatus, the combination of a cylindrical casing, one end of which is formed with a depending neck portion having a flange, a casing below said first named casing, one end of which is formed with an upstanding flanged neck portion, said flanges being formed with centering shoulders and arcuate slots, bolts which pass through said slots for securing said casings together with capacity for angular adjustment, conveying screws in said casings, respectively, provided at opposite ends with bevel gears, a bushing surrounding the neck portions of said casings, and a gear element turning on said bushing having two sets of bevel gear teeth for meshing with the aforesaid bevel gears, respectively.

ALBERT H. BRUNNER.